US010028118B2

(12) United States Patent
Li

(10) Patent No.: US 10,028,118 B2
(45) Date of Patent: Jul. 17, 2018

(54) INTELLIGENT SECURITY IDENTIFICATION APPARATUS AND SYSTEM

(71) Applicant: BOE TECHNOLOGY GROUP CO., LTD., Beijing (CN)

(72) Inventor: Hui Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 14/443,962

(22) PCT Filed: Mar. 31, 2015

(86) PCT No.: PCT/CN2015/075524
§ 371 (c)(1),
(2) Date: May 19, 2015

(87) PCT Pub. No.: WO2016/082404
PCT Pub. Date: Jun. 2, 2016

(65) Prior Publication Data
US 2016/0148480 A1 May 26, 2016

(30) Foreign Application Priority Data
Nov. 26, 2014 (CN) ...................... 2014 2 0721202 U

(51) Int. Cl.
G08B 1/08 (2006.01)
H04W 4/80 (2018.01)
(Continued)

(52) U.S. Cl.
CPC .............. H04W 4/80 (2018.02); H04B 1/385 (2013.01); H04W 4/025 (2013.01); G08B 21/0286 (2013.01)

(58) Field of Classification Search
None
See application file for complete search history.

(56) References Cited
U.S. PATENT DOCUMENTS 8,698,594 B2 * 4/2014 Erhart ..................... G06F 21/32
340/5.1
2003/0030561 A1 * 2/2003 Yafuso ............... G08B 21/0227
340/573.4
(Continued)

FOREIGN PATENT DOCUMENTS

CN 101840619 A 9/2010
CN 102800168 A 11/2012
(Continued)

OTHER PUBLICATIONS

International Search Report in Chinese from PCT Application Serial No. PCT/CN2015/075524, dated Jun. 29, 2015.

Primary Examiner — Brian Zimmerman
Assistant Examiner — Kevin Lau
(74) Attorney, Agent, or Firm — Kinney & Lange, P.A.

(57) ABSTRACT

The present disclosure discloses an intelligent security identification apparatus and system, to improve the security of the intelligent security identification apparatus and system. The intelligent security identification apparatus comprises: a body portion; an annular belt portion comprising a first annular belt and a second annular belt, wherein the body portion has one end connected to one end of the first annular belt and the other end connected to one end of the second annular belt, the first annular belt has a first conductor arranged therein and the second annular belt has a second conductor arranged therein; and a latch portion comprising a latch plug and a latch socket, wherein the other end of the first annular belt is connected to the latch plug, and the other end of the second annular belt is connected to the latch socket. The body portion comprises: an IC module, wherein the first conductor has one end connected to the IC module and the other end connected to the latch plug, the second conductor has one end connected to the IC module and the other end connected to the latch socket, and the latch
(Continued)

portion, the first conductor, the second conductor, and the IC module form a circuit loop when the latch plug is engaged to the latch socket.

18 Claims, 2 Drawing Sheets

(51) Int. Cl.
*H04B 1/3827* (2015.01)
*H04W 4/02* (2018.01)
*G08B 21/02* (2006.01)

(56) References Cited

U.S. PATENT DOCUMENTS

| | | | |
|---|---|---|---|
| 2010/0231378 A1* | 9/2010 | Ward | A61B 5/0402 340/539.11 |
| 2012/0050532 A1* | 3/2012 | Rhyins | G01S 5/14 348/143 |
| 2012/0157037 A1* | 6/2012 | Hoffman | G08B 25/08 455/404.2 |
| 2014/0247124 A1 | 9/2014 | Ros | |
| 2015/0186092 A1* | 7/2015 | Francis | G06F 3/1423 345/520 |
| 2015/0271632 A1* | 9/2015 | Venkatraman | H04W 4/02 455/456.2 |
| 2015/0279187 A1* | 10/2015 | Kranz | G08B 21/0415 340/539.12 |
| 2016/0078752 A1* | 3/2016 | Vardi | G08B 29/046 340/506 |

FOREIGN PATENT DOCUMENTS

| | | |
|---|---|---|
| CN | 202854875 U | 4/2013 |
| CN | 203493625 U | 3/2014 |

* cited by examiner

INTELLIGENT SECURITY IDENTIFICATION APPARATUS AND SYSTEM

CROSS-REFERENCE TO RELATED APPLICATION(S)

This application is the national phase of PCT Application No. PCT/CN2015/075524 filed Mar. 31, 2015, which claims priority to Chinese Patent Application No. 201420721202.0, filed on Nov. 26, 2014, entitled "INFANT INTELLIGENT ANKLE RING AND SYSTEM", which is incorporated herein by reference in its entirety.

TECHNICAL FIELD

The present disclosure relates to the field of electronic technologies, and in particular, to an intelligent security identification apparatus and system.

BACKGROUND

At the newborn of an infant or when an infant seeks medical advices in a hospital, the infant and his/her family are generally identified by wearing an intelligent security identification device such as a tag wrist ring, a tag ankle ring, a tag wrist band or the like. However, in consideration that many personal factors are involved in this approach, once an error occurs in the identification, a large influence will be brought to the infant's family and the medical institutions. In addition, as most hospital management systems are not perfect in the current stage, particularly, the infant sickroom, the mother and infant room or the like are poorly supervised, the infant theft cases are very likely to occur. In recent 10 years, there are about 16 million newborn infants in our country every year. It needs to look after and take care of the large-scale group of infants more safely and effectively. In addition, children, old people and intellectually disabled people also need to wear an intelligent security identification device at home or in the hospital for medical advices, so as to avoid being lost or not getting timely rescue and treatment.

However, there are currently a few solutions proposed to solve the problem in our country, and the current approaches are implemented by wearing a tag wrist ring, supervising by a specially-assigned person or the like, which are ineffective. For example, when there are many newborn infants and ill infants, it is difficult to take care of each infant. Some wrist rings or ankle rings which can detect physical sign parameters of a human body are proposed in the related art; however, neither the wrist rings nor the ankle rings have a latch portion which is controlled by an electrical signal and can improve security.

SUMMARY

Embodiments of the present disclosure provide an intelligent security identification apparatus and system, which improve the security of the intelligent security identification apparatus and system by adding a latch portion which is controlled by an electrical signal.

An intelligent security identification apparatus according to an embodiment of the present disclosure comprises:
a body portion;
an annular belt portion comprising a first annular belt and a second annular belt, wherein the body portion has one end connected to one end of the first annular belt and the other end connected to one end of the second annular belt, the first annular belt has a first conductor arranged therein and the second annular belt has a second conductor arranged therein; and
a latch portion comprising a latch plug and a latch socket, wherein the other end of the first annular belt is connected to the latch plug, and the other end of the second annular belt is connected to the latch socket;
wherein the body portion comprises:
an Integrated Circuit (IC) module, wherein the first conductor has one end connected to the IC module and the other end connected to the latch plug, the second conductor has one end connected to the IC module and the other end connected to the latch socket, and when the latch plug is engaged to the latch socket, the latch portion, the first conductor, the second conductor, and the IC module form a circuit loop;
a communication module configured to receive information;
a data module configured to store the information received by the communication module; and
a display module configured to display the information stored in the data module.

The intelligent security identification apparatus according to the embodiment of the present disclosure has a latch portion arranged therein. When the latch plug is engaged to the latch socket in the latch portion, the latch portion, the first conductor, the second conductor, and the IC module form a circuit loop, which achieves an intelligent security identification apparatus with a latch portion which is controlled by an electrical signal, thereby improving the security of the intelligent security identification apparatus.

Preferably, the IC module is further electrically connected to the communication module, and the IC module is configured to detect a current change when the circuit loop is open and transmit an alarm signal to a server through the communication module in response to the current change.

Thereby, an alarm can be generated when the intelligent security identification apparatus encounters malicious destruction, thereby further improving the security of the intelligent security identification apparatus.

Preferably, the display module is further electrically connected to the communication module, and the display module is a touch display module, and configured to collect fingerprint information and transmit the fingerprint information to the server through the communication module; and The IC module is further configured to cut off the current in the circuit loop upon receiving an unlocking signal transmitted by the server through the communication module, to achieve unlocking of the latch portion.

Thereby, unlocking of the intelligent security identification apparatus can be achieved through fingerprint, thereby further improving the security of the intelligent security identification apparatus.

Preferably, the touch display module is a flexible touch display module.

Thereby, the intelligent security identification apparatus may become more flexible, so that the intelligent security identification apparatus is worn more comfortably.

Preferably, the body portion further comprises a detection module including at least one of a temperature sensor, a breath sensor and a pulse sensor; and The respective sensors included in the detection module are electrically connected to the data module, so that the collected physical sign information is recorded in the data module, is displayed on the display module, and is transmitted to the server through the communication module.

Thereby, the intelligent security identification apparatus can achieve detection, archiving, and display of physical sign parameters of an object who wears the intelligent security inspection apparatus on the premise that the intelligent security identification apparatus is of higher security.

Preferably, the body portion further comprises a Wireless Fidelity (WIFI) positioning module electrically connected to the communication module;

wherein, the WIFI positioning module collects Media Access Control (MAC) addresses of Access Points (APs) when the WIFI positioning module is started up, and transmits the MAC addresses to the server through the communication module, and location information of the intelligent security identification apparatus returned by the server is received by the communication module, is recorded in the data module and is displayed on the display module.

Thereby, positioning of the intelligent security identification apparatus can be implemented in real time in a safe range.

Preferably, the body portion further comprises a Global Positioning System (GPS) positioning module electrically connected to the communication module.

The GPS positioning module is started up by accepting a trigger from the server through the communication module, to implement GPS positioning, and transmit the GPS positioning information to the server through the communication module.

Thereby, real-time positioning of the object who wears the intelligent security inspection apparatus can be achieved by implementing positioning of the intelligent security identification apparatus in real time, thereby further improving the security of the intelligent security identification apparatus.

Preferably, the communication module comprises at least one of a Bluetooth module, a WIFI positioning module, and a 3G module.

An intelligent security identification system according to an embodiment of the present disclosure comprises the security identification apparatus according to any of the above embodiments of the present disclosure and a server.

The intelligent security identification apparatus in the intelligent security identification system according to the embodiment of the present disclosure has a latch portion arranged therein. When the latch plug is engaged to the latch socket in the latch portion, the latch portion, the first conductor, the second conductor, and the IC module form a circuit loop, which achieves an intelligent security identification apparatus with a latch portion which is controlled by an electrical signal, thereby improving the security of the intelligent security identification system.

Preferably, the system further comprises an alarm apparatus, wherein, the server compares the fingerprint information collected by the display module with preset fingerprint information of the intelligent security identification apparatus if fingerprint information is received by the server, and transmits an unlocking signal to the security identification apparatus when the comparison result indicates that it is consistent; and the server triggers the alarm apparatus to generate an alarm, if the server has not transmitted an unlocking signal to the IC module before receiving an alarm signal transmitted by the IC module.

Thereby, secure unlocking of the intelligent security identification apparatus is achieved when the fingerprints are matched. An alarm will be generated, if illegal fingerprint information is input or the intelligent security identification apparatus is maliciously destructed, thereby largely improving the security of the intelligent security identification system.

Preferably, the server compares the received physical sign information with preset physical sign information, and triggers the alarm apparatus to generate an alarm when an alarm condition is met.

Thereby, an alarm is generated when physical sign parameters of an object who wears the intelligent security identification apparatus are abnormal, to enable the object to be rescued timely and avoid the delay of the illness.

Preferably, after receiving the MAC addresses of the APs, the server determines the location information of the intelligent security identification apparatus according to the MAC addresses of the APs and the signal intensity, returns the location information of the intelligent security identification apparatus to the intelligent security identification apparatus if the location information is within a preset range; otherwise, triggers the alarm apparatus to generate an alarm, and triggers the GPS positioning module of the intelligent security identification apparatus to be started up, to receive the GPS positioning information transmitted by the intelligent security identification apparatus.

Thereby, real-time positioning of the object who wears the intelligent security identification apparatus can be achieved by implementing positioning of the intelligent security identification apparatus in real time. An alarm is generated and positioning of the object is implemented when the object is within a non-specified range, for example, when an infant is maliciously taken away or children, old people or intellectually disabled people are lost, thereby further improving the security of the intelligent security identification system.

The alarm apparatus may be located inside the server, or may also be located outside the server. The alarm apparatus may be one alarm apparatus, or may also be multiple alarm apparatuses distributed in different locations.

DETAILED DESCRIPTION

Embodiments of the present disclosure provide an intelligent security identification apparatus and system, which improve the security of the intelligent security identification apparatus and system by adding a latch portion which is controlled by an electrical signal.

Figure 1:
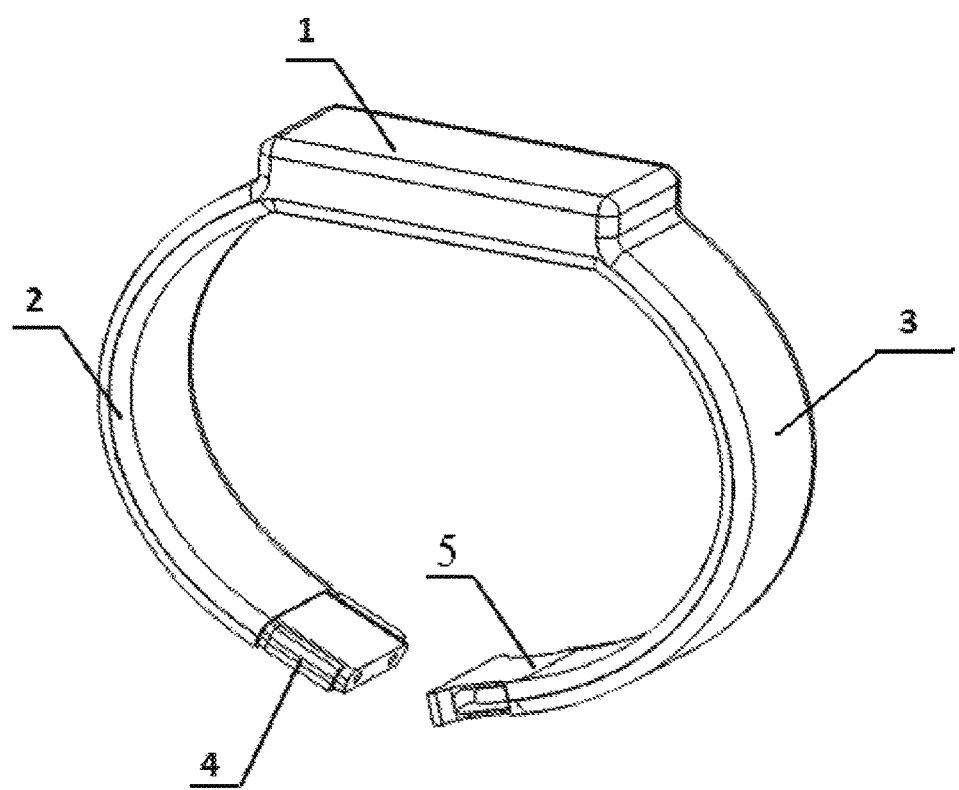
FIG. 1 is an overall structural diagram of an intelligent security identification apparatus according to an embodiment of the present disclosure.

As shown in FIG. 1, an intelligent security identification apparatus according to an embodiment of the present disclosure comprises: a body portion 1, an annular belt portion, and a latch portion, wherein the annular belt portion comprises a first annular belt 2 and a second annular belt 3, and the latch portion comprises a latch plug 4 and a latch socket 5.

The body portion 1 has one end connected to one end of the first annular belt 2 and the other end connected to one end of the second annular belt 3, the other end of the first annular belt 2 is connected to the latch plug 4, and the other end of the second annular belt 3 is connected to the latch socket 5.

Figure 2:
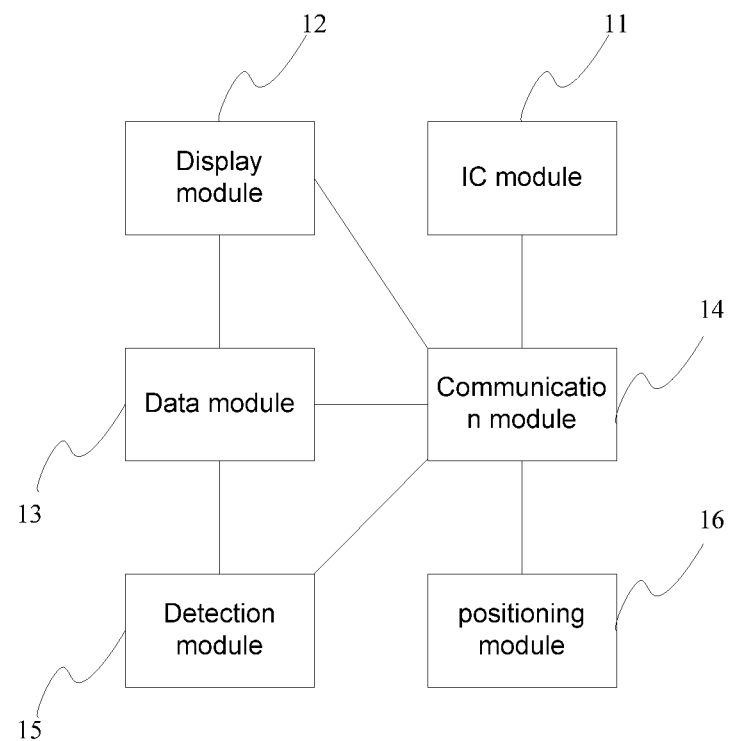
FIG. 2 is a specific structural diagram of a body portion in an intelligent security identification apparatus according to an embodiment of the present disclosure.

As shown in FIG. 2, the body portion 1 comprises an IC module 11, a display module 12, a data module 13, and a communication module 14.

The first annular belt 2 has a first conductor arranged therein, and the second annular belt 3 has a second conductor arranged therein. The first conductor has one end connected to the IC module 11 and the other end connected to the latch plug 4, and the second conductor has one end connected to the IC module 11 and the other end connected to the latch socket 5. When the latch plug 4 is engaged to the latch socket 5, the latch portion, the first conductor, the second conductor, and the IC module 11 form a circuit loop.

The data module 13 is configured to store information received through the communication module 14, and the display module 12 is configured to display the information stored in the data module 13.

The intelligent security identification apparatus according to the embodiment of the present disclosure has a latch portion arranged therein. The latch portion, the first conductor, the second conductor, and the IC module 11 form a circuit loop when the latch plug 4 is engaged to the latch socket 5, which achieves an intelligent security identification apparatus with a latch portion which is controlled by an electrical signal, thereby improving the security of the intelligent security identification apparatus.

Preferably, the IC module 11 detects a current change when the loop is open, and transmits an alarm signal to a server through the communication module 14 in response to the current change.

Thereby, an alarm can be generated when the intelligent security identification apparatus encounters malicious destruction, thereby further improving the security of the intelligent security identification apparatus.

In the embodiment of the present disclosure, the latch portion is primarily designed by using side release buckles with plugs for circuit connection on both ends thereof. The signal detection is implemented by connecting two Flexible Printed Circuit (FPC) flat cables (i.e., the first conductor and the second conductor) and the IC module 11 (which comprises a rechargeable battery for supplying power to the module) for detecting a current change, wherein the FPC flat cables are groups of connecting wires which are flexible to some extent.

Before use, it's needed to preset fingerprint information of a particular health-care worker. The fingerprint information may be input on the security identification apparatus side and/or the server side, and is recorded in the data module. When the security identification apparatus is in use, the side release buckles of the latch portion are engaged, to form a circuit loop and generate a weak current, thereby starting up the IC module. When the security identification apparatus encounters a phenomenon such as violent destruction or the like (for example, cut-off), the current in the whole circuit loop will be changed, which triggers the IC module 11 to transmit the current change to the server side through the communication module, thereby generating an alarm. When the correct fingerprint information is input through the security identification apparatus or the server, the unlocking is successful, the latch of the intelligent security identification apparatus is unlocked, and the circuit loop is open. In this case, although the IC module 11 also detects the current change, as the correct fingerprint information is input, the intelligent security identification apparatus will not trigger the generation of an alarm even if it is taken down. The server may generate an alarm when the unlocking fails more than three times, i.e., the error fingerprint information is input in succession more than three times. The accumulation of the specific times and the judgment on whether to trigger an alarm may be implemented on the server side, which can simplify the body portion of the intelligent security identification apparatus, and save the cost of the intelligent security identification apparatus. Of course, the judgment and the triggering of an alarm may also be implemented by the intelligent security identification apparatus.

Preferably, the display module 12 is a touch display module, which is further configured to collect fingerprint information and transmit the fingerprint information to the server through the communication module.

The IC module 11 is further configured to cut off the current in the loop upon receiving an unlocking signal transmitted by the server through the communication module, to achieve unlocking of the latch portion.

Thereby, unlocking of the intelligent security identification apparatus can be achieved through fingerprint, thereby further improving the security of the intelligent security identification apparatus.

Preferably, the touch display module is a flexible touch display module, which may be configured to display physical sign information or the like of an object who wears the intelligent security identification apparatus and input information for unlocking, such as fingerprint or the like.

With the flexible material, the intelligent security identification apparatus may become more flexible, so that the intelligent security identification apparatus is worn more comfortably.

Preferably, as shown in FIG. 2, the body portion 1 further comprises a detection module 15, which comprises a module for detecting related parameters, such as a temperature sensor, a breath sensor, and/or a pulse sensor or the like.

The collected physical sign information is recorded by the detection module 15 in the data module 13, is displayed on the display module 12, and is transmitted to the server through the communication module 14.

Thereby, the intelligent security identification apparatus can achieve detection, archiving, and display of physical sign parameters of an object who wears the intelligent security inspection apparatus on the premise that the intelligent security identification apparatus is of higher security.

The detection module 15 is close to the skin of the object who wears the intelligent security inspection apparatus, to achieve accurate detection of the object's physical signs. The detected information is uploaded by the detection module 15 to the data module, and is then transmitted to the server through the communication module 14, thereby tracking the physical state for convenience of monitoring the object's physical condition by a doctor. An alarm is generated timely by the server, to notify doctors or nurses to implement a corresponding treatment if an abnormal fluctuation is found in the information.

Preferably, as shown in FIG. 2, the body portion 1 further comprises a positioning module 16, which comprises a WIFI positioning module and a GPS positioning module.

The WIFI positioning module collects MAC addresses of APs when the WIFI positioning module is started up, and transmits the MAC addresses to the server through the communication module 14. Location information of the security identification apparatus returned by the server is received by the communication module 14, is recorded in the data module 13, and is displayed on the display module 12.

The GPS positioning module is triggered by the server to be started up, to implement GPS positioning, and transmit the GPS positioning information to the server through the communication module 14.

Thereby, real-time positioning of the object who wears the intelligent security inspection apparatus can be achieved by implementing positioning of the intelligent security identification apparatus in real time, thereby further improving the security of the intelligent security identification apparatus.

The positioning module 16 is comprised of a WIFI positioning module and a GPS positioning module, wherein the WIFI positioning module is primarily responsible for indoor positioning of an object who wears the intelligent security inspection apparatus, and the GPS positioning module is primarily responsible for outdoor positioning of the object. The reason of the design is that the transmission distance of the WIFI positioning module is generally within 0-20 meters, which is a short distance range, and the WIFI positioning module is an indoor positioning measure suitable for accurate positioning of the object in a sickroom; and the GPS positioning module is an outdoor positioning and guard against theft measure for outdoor positioning of the object. For power saving, the WIFI module and the GPS module are operated separately, and the WIFI positioning module is activated and the GPS positioning module is turned off when the object is in the range of a hospital. The WIFI positioning module scans and collects MAC addresses of surrounding APs, and transmits these MAC addresses to the server. The server retrieves a geographical location of each AP, calculates a geographical location of the intelligent security identification apparatus in combination with the intensity level of each AP signal, and returns the geographical location of the intelligent security identification apparatus to the positioning module 16, thereby achieving positioning. When the object leaves the sickroom in an abnormal condition (for example, an infant is stolen, or children, old people or intellectually disabled people are lost), the server determines that the geographical location of the intelligent security identification apparatus is out of a preset location range, and triggers the GPS positioning module. In this case, the GPS positioning module transmits the current location of the object to the server and notifies related people to implement an emergence treatment through an alarm module arranged inside the server or an alarm module arranged outside the server, thereby avoiding occurrence of events such as an infant being stolen or children, old people or intellectually disabled people being lost or the like.

Preferably, the communication module 14 comprises at least one of communication modules, such as a Bluetooth module, a WIFI positioning module, a 3G module or the like.

As for material selection, the novel intelligent security identification apparatus according to the present disclosure selects a flexible material in cooperation with the silicone-rubber material covered on the body portion, which can ensure that the intelligent security identification apparatus will not stimulate the wearer's skin. A latch portion which is unlocked by an electrical signal is arranged on the intelligent security identification apparatus, and various hardware modules and devices such as WIFI and GPS positioning modules as well as a temperature sensor, a pulse sensor, a breath sensor or the like are integrated on the body portion, which achieves functions such as monitoring, processing, and recording the wearer's health parameters, identifying and positioning the wearer, generating an alarm for the wearer or the like. The positioning module primarily achieves positioning of a wearer by using the WIFI technology and the GPS technology; the display module 12 is primarily configured to display the wearer's personal information and physiological parameters; and an unlocking function of the intelligent security identification apparatus is primarily achieved through fingerprint, to prevent violent destruction of the intelligent security identification apparatus.

Figure 3:
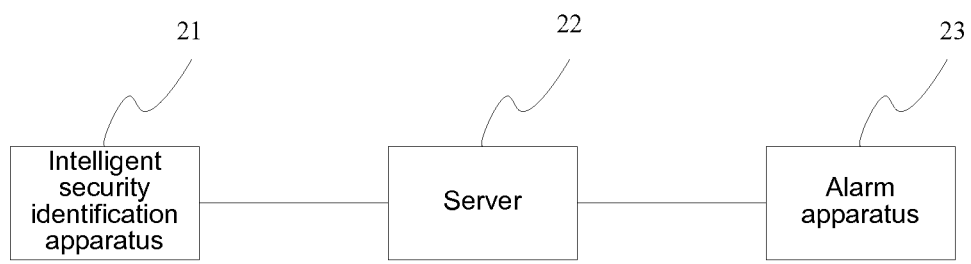
FIG. 3 is a structural diagram of an intelligent security identification system according to an embodiment of the present disclosure.

As shown in FIG. 3, an intelligent security identification system according to an embodiment of the present disclosure comprises the intelligent security identification apparatus 21 according to any of the above embodiments of the present disclosure, a server 22 and an alarm apparatus 23.

The intelligent security identification apparatus 21 in the intelligent security identification system according to the embodiment of the present disclosure has a latch portion arranged therein. The latch portion, a first conductor, a second conductor, and an IC module form a circuit loop when a latch plug is engaged to a latch socket, to achieve the intelligent security identification apparatus 21 with a latch portion which is controlled by an electrical signal, thereby improving the security of the intelligent security identification system.

Preferably, the server 22 compares the fingerprint information with preset fingerprint information of the security identification apparatus 21 if the server 22 receives fingerprint information transmitted by the security identification apparatus 21, and the server 22 transmits an unlocking signal to the intelligent security identification apparatus when the comparison result indicates that it is consistent.

the server 22 triggers the alarm apparatus 23 to generate an alarm, if the server 22 has not transmitted an unlocking signal to the security identification apparatus 21 before receiving an alarm signal transmitted by the IC module of the security identification module 21 through the communication module.

Thereby, secure unlocking of the intelligent security identification apparatus 21 is achieved during the comparison of the fingerprint information. An alarm will be generated, if illegal fingerprint information is input or the intelligent security identification apparatus 21 is maliciously destructed, thereby largely improving the security of the intelligent security identification system.

Preferably, the server compares the received physical sign information transmitted by the intelligent security identification apparatus with the preset physical sign information, and the server triggers the alarm apparatus to generate an alarm when an alarm condition is met.

Thereby, an alarm is generated when the wearer's physical sign parameters are abnormal, to enable the wearer to be rescued timely and avoid the delay of the illness.

Preferably, after receiving the MAC addresses of the APs transmitted by the intelligent security identification apparatus 21, the server 22 determines the location information of the intelligent security identification apparatus 21 according to the MAC addresses of the APs and the signal intensity. The server 22 returns the location information to the intelligent security identification apparatus 21 if the location information of the intelligent security identification apparatus 21 is within a preset range; otherwise, the server 22 triggers the alarm apparatus to generate an alarm, and triggers the GPS positioning module of the intelligent security identification apparatus 21 to be started up, to receive the GPS positioning information transmitted by the intelligent security identification apparatus 21.

Thereby, real-time positioning of the wearer can be achieved by implementing positioning of the intelligent security identification apparatus 21 in real time. When the wearer is within a non-specified range, for example, when an infant is maliciously taken away or children, old people or intellectually disabled people are lost, an alarm is generated and positioning of the wearer is implemented, thereby further improving the security of the intelligent security identification system.

Preferably, the alarm apparatus 23 may be located inside the server 22, or may also be located outside the server 22. The alarm apparatus 23 may be one alarm apparatus, or may also be multiple alarm apparatuses distributed in different locations.

In conclusion, the intelligent security identification apparatus and system according to the embodiments of the present disclosure achieve functions such as identifying the wearer's physical sign parameters, positioning the wearer, monitoring the physical signs or the like, provide a doctor with data based on which the wearer's physical condition is monitored and a further treatment is provided, and avoid occurrence of phenomenon such as an infant being stolen or children, old people or intellectually disabled people being lost or the like. Specifically, the intelligent security identification system achieves positioning of the wearer through the WIFI positioning module and the GPS positioning module. The WIFI positioning module is primarily responsible for indoor positioning of the wearer, and when the location of the wearer is out of a specified region, the GPS positioning module is triggered. The current location of the wearer is transmitted by the GPS positioning module to the server and an alarm is generated, thereby avoiding occurrence of phenomenon such as an infant being stolen or children, old people or intellectually disabled people being lost or the like. The intelligent security identification system has a latch module, which comprises a latch portion in a form of side release buckles. The detection circuit is comprised of FPC flat cables, a rechargeable battery, and a matching IC module. When the side release buckles are engaged, the IC module detects that the circuit is turned on, and a weak current is generated in the circuit. When the intelligent security identification apparatus encounters a phenomenon such as violent destruction or the like (for example, cut-off), the current in the whole circuit loop will be changed. After the IC module detects the change, it will trigger generation of an alarm. It will not trigger generation of an alarm when the latch portion is unlocked correctly through fingerprint. The intelligent security identification system has a flexible screen display module configured to display information of the wearer, and achieve unlocking of the intelligent security identification apparatus by means of fingerprint identification, thereby improving the security of the system.

Obviously, those skilled in the art can make various modifications and variations to the present disclosure without departing from the spirit and scope of the present disclosure. Thus, if these modifications and variations of the present disclosure belong to the scope of the claims of the present disclosure and the equivalent technologies thereof, the present disclosure is also intended to include these modifications and variations.

I claim:

1. An intelligent security identification apparatus, comprising:
   a body portion;
   an annular belt portion comprising a first annular belt and a second annular belt, wherein the body portion has one end connected to one end of the first annular belt and the other end connected to one end of the second annular belt, the first annular belt has a first conductor arranged therein and the second annular belt has a second conductor arranged therein; and
   a latch portion comprising a latch plug and a latch socket, wherein the other end of the first annular belt is connected to the latch plug, and the other end of the second annular belt is connected to the latch socket;
   wherein the body portion comprises:
      an Integrated Circuit (IC) module, wherein the first conductor has one end connected to the IC module and the other end connected to the latch plug, the second conductor has one end connected to the IC module and the other end connected to the latch socket, and the latch portion, the first conductor, the second conductor, and the IC module form a circuit loop when the latch plug is engaged to the latch socket;
      a communication circuit module, wherein the communication circuit module receives information;
      a data storage circuit module, wherein the data storage circuit module stores the information received by the communication circuit module; and
      a display circuit module, wherein the display circuit module displays the information stored in the data storage circuit module, wherein the display circuit module is further electrically connected to the communication circuit module, and the display circuit module is a touch display circuit module, and configured to collect fingerprint information and transmit the fingerprint information to the server through the communication circuit module; and
   wherein the IC module is further electrically connected to the communication module, and the IC module is configured to detect a current change when the circuit loop is open and transmit the current change to a server through the communication module, so that the server determines whether a correct fingerprint information has been received in response to reception of the current change, and generates an alarm if no correct fingerprint information is received.

2. The intelligent security identification apparatus according to claim 1, wherein
   the IC module is further configured to cut off the current in the circuit loop upon receiving an unlocking signal transmitted by the server through the communication circuit module, to achieve unlocking of the latch portion.

3. The intelligent security identification apparatus according to claim 2, wherein the touch display circuit module is a flexible touch display circuit module.

4. The intelligent security identification apparatus according to claim 1, wherein the body portion further comprises a detection module including at least one of a temperature sensor, a breath sensor and a pulse sensor; and
   respective sensors included in the detection module are electrically connected to the data storage circuit module, so that the collected physical sign information is recorded in the data storage circuit module, is displayed on the display circuit module, and is transmitted to the server through the communication circuit module.

5. The intelligent security identification apparatus according to claim 1, wherein the body portion further comprises a Wireless Fidelity (WIFI) positioning module electrically connected to the communication circuit module;
   wherein, the WIFI positioning module collects Media Access Control (MAC) addresses of Access Points (APs) when the WIFI positioning module is started up, and transmits the MAC addresses to the server through the communication circuit module, and location information of the security identification apparatus returned by the server is received by the communication circuit module, is recorded in the data storage circuit module and is displayed on the display circuit module.

6. The intelligent security identification apparatus according to claim 1, wherein the body portion further comprises a Global Positioning System (GPS) positioning module electrically connected to the communication circuit module; and the GPS positioning module is started up by accepting a trigger from the server through the communication circuit module, to implement GPS positioning, and transmit the GPS positioning information to the server through the communication circuit module.

7. The intelligent security identification apparatus according to claim 1, wherein the communication circuit module comprises at least one of a Bluetooth module, a WIFI positioning module, and a 3G module.

8. The intelligent security identification apparatus according to claim 1, wherein the intelligent security identification apparatus is a wrist ring, an ankle ring, or a wrist belt.

9. An intelligent security identification system, comprising the intelligent security identification apparatus according to claim 1 and the server.

10. The system according to claim 9, further comprising an alarm apparatus, wherein, the server compares fingerprint information collected by the display circuit module with preset fingerprint information of the intelligent security identification apparatus if the fingerprint information is received by the server, and transmits an unlocking signal to the intelligent security identification apparatus when the comparison result indicates that it is consistent; and the server triggers the alarm apparatus to generate an alarm if the server has not transmitted an unlocking signal to the IC module before receiving the current change transmitted by the IC module.

11. The system according to claim 10, wherein the server compares the physical sign information received from the intelligent security identification apparatus with preset physical sign information, and triggers the alarm apparatus to generate an alarm when an alarm condition is met.

12. The system according to claim 10, wherein the server determines the location information of the intelligent security identification apparatus according to MAC addresses of Access Points (APs) and the signal intensity, after receiving the MAC addresses of the APs, returns the location information to the intelligent security identification apparatus if the location information of the intelligent security identification apparatus is within a preset range: otherwise, triggers the alarm apparatus to generate an alarm, and triggers the GPS positioning module of the intelligent security identification apparatus to be started up, to receive the GPS positioning information transmitted by the intelligent security identification apparatus.

13. The system according to claim 9, wherein the display circuit module is further electrically connected to the communication circuit module, and the display circuit module is a touch display circuit module, and configured to collect fingerprint information and transmit the fingerprint information to the server through the communication circuit module; and the IC module is further configured to cut off the current in the circuit loop upon receiving an unlocking signal transmitted by the server through the communication circuit module, to achieve unlocking of the latch portion.

14. The system according to claim 13, wherein the touch display circuit module is a flexible touch display circuit module.

15. The system according to claim 9, wherein the body portion further comprises a detection module including at least one of a temperature sensor, a breath sensor and a pulse sensor; and respective sensors included in the detection module are electrically connected to the data storage circuit module, so that the collected physical sign information is recorded in the data storage circuit module, is displayed on the display circuit module, and is transmitted to the server through the communication circuit module.

16. The system according to claim 9, wherein the body portion further comprises a Wireless Fidelity (WIFI) positioning module electrically connected to the communication circuit module;

wherein, the WIFI positioning module collects Media Access Control (MAC) addresses of Access Points (APs) when the WIFI positioning module is started up, and transmits the MAC addresses to the server through the communication circuit module, and location information of the security identification apparatus returned by the server is received by the communication circuit module, is recorded in the data storage circuit module and is displayed on the display circuit module.

17. The system according to claim 9, wherein the body portion further comprises a Global Positioning System (GPS) positioning module electrically connected to the communication circuit module; and the GPS positioning module is started up by accepting a trigger from the server through the communication circuit module, to implement GPS positioning, and transmit the GPS positioning information to the server through the communication circuit module.

18. The system according to claim 9, wherein the communication circuit module comprises at least one of a Bluetooth module, a WIFI positioning module, and a 3G module.

* * * * *